United States Patent [19]

Stone et al.

[11] Patent Number: 6,068,762
[45] Date of Patent: *May 30, 2000

[54] REUSABLE OIL FILTER ASSEMBLY

[75] Inventors: Walter H. Stone, Modesto; Michael D. Clausen, Turlock, both of Calif.

[73] Assignee: Parker-Hannifin Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/721,417

[22] Filed: Sep. 26, 1996

Related U.S. Application Data

[60] Provisional application No. 60/004,651, Sep. 29, 1995.

[51] Int. Cl.⁷ ........................ B01D 35/143; B01D 35/147
[52] U.S. Cl. ............................ 210/90; 210/130; 210/342; 210/444; 210/450; 210/DIG. 13; 210/DIG. 17
[58] Field of Search ............................... 210/90, 130, 315, 210/342, 440, DIG. 13, DIG. 17, 450, 444, 443; 200/82 D

[56] References Cited

U.S. PATENT DOCUMENTS

| | | |
|---|---|---|
| Re. 24,509 | 7/1958 | Buckman . |
| 217,126 | 7/1879 | Loudon . |
| 401,057 | 4/1889 | Perkins . |
| 539,800 | 5/1895 | Durant . |
| 1,165,640 | 12/1915 | Pelton . |
| 1,677,118 | 7/1928 | Ford . |
| 1,906,984 | 5/1933 | Lyman . |
| 2,011,031 | 8/1935 | Birch . |

(List continued on next page.)

FOREIGN PATENT DOCUMENTS

| | | |
|---|---|---|
| 733817 | 5/1966 | Canada . |
| 824484 | 10/1969 | Canada ................................ 210/493.2 |
| 828543 | 12/1969 | Canada . |
| 0 044 539 | 1/1982 | European Pat. Off. . |
| 2235837 | 1/1974 | Germany . |
| 24 60 073 | 7/1976 | Germany . |
| 28 15 993 | 10/1979 | Germany . |
| 3738718 A1 | 7/1988 | Germany . |
| 1141751 | 8/1980 | Italy . |
| 580880 | 11/1977 | U.S.S.R. ................................. 210/90 |
| 2140317 | 11/1984 | United Kingdom ................ 210/493.2 |

OTHER PUBLICATIONS

Literature from Baldwin Filters for BD–103 Filter, publication date unknown.

Primary Examiner—Matthew O. Savage
Attorney, Agent, or Firm—Christopher H. Hunter

[57] ABSTRACT

A filter assembly includes a housing having a cylindrical side wall and a first and second end walls at either end of the cylindrical side wall. The first end wall has a fluid inlet port for receiving fluid to be filtered and at least one fluid outlet port for discharging the filtered fluid. The second end wall is easily removable from the housing, and includes a pressure-activated sensing device preferably extending centrally within filter media to an outlet. The filter media can comprise either a single filter element or a pair of nested filter elements, and is supported between the upper and lower end walls. The pressure-activated sensing device includes a piston assembly which is responsive to a pressure drop across the filter media. A first flow path is provided to the upstream side of the piston assembly from the inlet to the filter assembly, while a second flow path is provided to the downstream side of the piston assembly from the downstream side of the filter media. When the fluid pressure the filter media increases, the piston assembly moves to an open position which can provide a signal to an operator that the filter media is clogged with particulate matter. Alternatively, or in addition, the pressure-activated sensing device can include a bypass valve which allows fluid to flow through the piston assembly. Further, the pressure-activated sensing device can also be located transversely to the axis of the housing and exterior to the lower end wall, but still integral therewith.

46 Claims, 7 Drawing Sheets

U.S. PATENT DOCUMENTS

| | | |
|---|---|---|
| 2,271,054 | 1/1942 | Williams . |
| 2,430,578 | 11/1947 | Matlock . |
| 2,605,904 | 8/1952 | Ogilvie . |
| 2,729,339 | 1/1956 | McCoy . |
| 2,798,695 | 7/1957 | Arlegue . |
| 2,894,630 | 7/1959 | Humbert, Jr. . |
| 2,929,506 | 3/1960 | Belgarde . |
| 2,995,250 | 8/1961 | Boewe et al. . |
| 3,000,505 | 9/1961 | Scavuzzo . |
| 3,000,509 | 9/1961 | Larter . |
| 3,036,711 | 5/1962 | Wilhelm ........................ 210/DIG. 17 |
| 3,199,679 | 8/1965 | Salyer, Jr. . |
| 3,224,591 | 12/1965 | Sawyer . |
| 3,239,062 | 3/1966 | Rosaen . |
| 3,262,563 | 7/1966 | Pall . |
| 3,265,213 | 8/1966 | Decker et al. . |
| 3,269,541 | 8/1966 | Neely . |
| 3,312,344 | 4/1967 | Rosaen . |
| 3,327,864 | 6/1967 | Ball et al. . |
| 3,333,697 | 8/1967 | Rosaen . |
| 3,349,919 | 10/1967 | Royer et al. . |
| 3,388,802 | 6/1968 | Wilkinson . |
| 3,463,317 | 8/1969 | Prier . |
| 3,487,929 | 1/1970 | Sample et al. . |
| 3,519,131 | 7/1970 | Rosaen et al. . |
| 3,519,360 | 7/1970 | Kudlek . |
| 3,519,560 | 7/1970 | Taylor . |
| 3,633,753 | 1/1972 | Petitjean . |
| 3,670,889 | 6/1972 | Brown et al. . |
| 3,822,787 | 7/1974 | Shaltis et al. . |
| 3,868,327 | 2/1975 | Van Gilder et al. . |
| 4,014,790 | 3/1977 | Arvanitakis . |
| 4,052,307 | 10/1977 | Humbert, Jr. . |
| 4,207,187 | 6/1980 | Booth . |
| 4,216,093 | 8/1980 | Kane et al. . |
| 4,222,875 | 9/1980 | Sikula, Jr. . |
| 4,227,899 | 10/1980 | Meny et al. . |
| 4,228,011 | 10/1980 | Cote, Jr. . |
| 4,246,109 | 1/1981 | Manders ................................... 210/90 |
| 4,316,801 | 2/1982 | Cooper . |
| 4,316,802 | 2/1982 | Howell . |
| 4,334,994 | 6/1982 | Jensen . |
| 4,581,135 | 4/1986 | Gerulis . |
| 4,622,136 | 11/1986 | Karcey . |
| 4,885,082 | 12/1989 | Cantoni . |
| 4,948,503 | 8/1990 | Baumann et al. . |
| 5,078,877 | 1/1992 | Cudaback et al. . |
| 5,080,787 | 1/1992 | Brown et al. . |
| 5,098,559 | 3/1992 | Mack et al. . |
| 5,160,037 | 11/1992 | LeCour . |
| 5,171,430 | 12/1992 | Beach et al. . |
| 5,182,015 | 1/1993 | Lee . |
| 5,217,606 | 6/1993 | Ramponi et al. . |
| 5,258,118 | 11/1993 | Gouritin et al. . |
| 5,342,511 | 8/1994 | Brown et al. . |
| 5,374,355 | 12/1994 | Habiger et al. . |
| 5,695,633 | 12/1997 | Ernst et al. ............................. 210/130 |

REUSABLE OIL FILTER ASSEMBLY

This application claims the benefit of U.S. Provisional Application No. 60/004,651 filed Sep. 29, 1995.

FIELD OF THE INVENTION

The present invention relates generally to fluid filter assemblies, and more particularly to reusable oil filter assemblies.

BACKGROUND OF THE INVENTION

Filtering units for filtering fluid, such as oil, are known in the art. A filter unit is typically placed in the oil line of an internal combustion engine to remove particulate matters and other contaminants from the oil to provide longer engine life and improved engine performance.

One typical oil filter unit has a cylindrical canister or housing which encloses a tubular filter element. One end of the canister is adapted for coupling to the engine block of the internal combustion engine. A typical coupling includes an internally-threaded opening that receives a corresponding externally-threaded nipple on the engine block. Oil inlet holes surround the nipple for receiving oil from the engine, and filtered oil is returned to the engine through the nipple. Gaskets surround the inlet holes and the nipple to seal the unit against the engine block. An additional conduit from the filter unit can extend centrally within the nipple to direct oil to a separate part of the vehicle, for example the crankcase. In this case, a filter media with a lower efficiency would typically be used to filter the oil returning to the engine, while a filter media with a higher efficiency would be used to filter the oil returning to the crankcase.

When the filter media becomes clogged with particulate matter and/or contaminants, the flow across the filter media becomes restricted, that is, the pressure on the upstream side of the filter media increases. If the pressure exceeds a predetermined level, more advanced filter units typically include a pressure-sensitive bypass valve which is activated so that the fluid bypasses the filter media and is returned essentially unfiltered to the engine and/or crankcase. In addition, a signalling device is often used to provide an indication to the operator that the filter must be serviced or replaced.

Disposable or throw-away type filter units of the above type are also known in the art. In these units, the entire canister is unscrewed from its threaded connection on the engine block, disposed of, and a new unit is put in its place. This filter unit is relatively expense in that an entirely new unit must be used each time the filter unit is serviced. In addition, the expended unit takes up valuable space in landfills. Karcey; U.S. Pat. No. 4,622,136; and Faria, U.S. Pat. No. 5,066,391, for example, disclose reusable oil filter assemblies wherein a tubular filter element can be removed from the housing, cleaned, and then replaced. The filter element can be accessed through a removable end wall on the canister. The Wilhelm unit, however, has the bypass valve in the head of the filter assembly, which can make it difficult to confirm that the bypass valve is operating properly. On the other hand, in both the Karcey and Faria designs, the filter element is removed by initially removing an end wall and then removing a separate bypass valve. While these reusable units might provide some advantages over the disposable or throw-away type filter units, the reusable units include numerous parts which must be fabricated and kept on hand to manufacture each filter unit, for example separate end walls and bypass valves. Each of these components requires labor and material costs to fabricate and assemble. Further, with these additional components, the complexity of servicing the filter unit is increased.

As such, it is believed that there is a demand in the industry for an improved fluid filter, and in particular, an improved reusable oil filter with a pressure-activated sensing device which provides easy access to the filter elements to facilitate servicing the filter, but which has fewer components to reduce manufacturing costs.

SUMMARY OF THE INVENTION

The present invention relates to an improved fluid filter, and in particular, an improved reusable oil filter which includes an unique end cap having an integral pressure-activated sensing device. The pressure-activated sensing device can be a signalling device, or a combination bypass valve and signalling device. The one-piece end cap with integral pressure-activated sensing device reduces the number of components in the filter, which thereby reduces the number of stock keeping units for the filter. In addition, with fewer components, the complexity of servicing the filter is also reduced. Finally, the filter is modular, that is, an end cap with an integral pressure-activated sensing device comprising a signalling device can be easily removed and replaced with a pressure-activated sensing device having a combination bypass valve and signalling device. This makes it possible to easily modify the filter for the particular application.

The reusable oil filter preferably comprises an outer cylindrical canister or housing with an upper annular end wall formed in one piece with the canister, and a lower, removable, annular end wall. According to a first embodiment of the present invention, the upper and lower end walls support a pair of concentrically arranged, inner and outer filter elements in the canister. Each filter element has a pair of end caps, with one end cap disposed at each end of the filter element. The upper end caps for the inner and outer filter elements support the upper ends of the filter elements and include appropriate seals for sealing against the upper end wall of the housing and/or the outlet nipple to the engine and conduit to the crankcase. The lower end caps for the inner and outer filter elements also support the lower ends of the filter elements. The lower end cap for the inner filter element further forms a cylinder extending upwardly and axially within the center of the filter elements. The cylinder has a closed upper end, which together with the walls of the cylinder, defines a cavity. At least one aperture provided on the lower end cap for the inner filter element allows fluid to flow from the downstream side of the outer (primary) filter element to the cavity in the cylinder.

The pressure-activated sensing device is fixedly attached to the lower end wall of the canister. The pressure-activated sensing device extends along the axial centerline of the housing and is contained within the cavity in the lower end cap of the inner filter element when the end wall is attached to the filter. The pressure-activated sensing device includes a cylindrical body extending upwardly from the end wall which is sealed along its exterior by an O-ring to the cylinder of the lower end cap. Apertures in the body of the pressure-activated sensing device provide a flow path from the inlet of the filter to the upstream side of the piston, while the apertures in the cylinder of the lower end cap provide a separate flow path from the downstream side of the primary filter media to the upstream side of the piston. The O-ring seal disposed between the body of the pressure-activated sensing device and the lower end cap separates the fluid paths.

A piston assembly is disposed within the cylindrical body, and includes a piston which is normally biased by a spring into a closed position. The head of the piston has an O-ring seal around its periphery which seals against the inside surface of the cylindrical body. The pressure-activated sensing device also includes a signalling device comprising a pair of contact pins which are normally in electrical contact with each other when the piston is in the closed position.

During filter operation, fluid flowing through the inlet openings to the filter passes around the periphery of the outer (primary) filter element and normally passes radially inward through the outer filter element and then axially upward through an outlet nipple to the engine, or further radially inward to be filtered through the inner (secondary) filter element and then upward through an additional conduit to the crankcase. However, when the primary filter media is clogged by particulate matter and/or contaminants, the pressure drop across the primary filter element increases, which thereby increases the pressure drop across the piston assembly. When the pressure increases above the bias of the spring, the piston moves to an open position, which separates the pair of contact pins and sends a remote signal to an operator to service the filter elements.

According to a further aspect of this embodiment, the sensing device can additionally or alternatively include a bypass valve with the signalling device. The bypass valve allows fluid to bypass the primary filter media and flow directly to the outlet when the piston moves to the open position. In this case, the piston has a slightly smaller outer dimension than the inner dimension of the cylindrical body of the pressure-activated sensing device such that fluid can flow around the piston. In addition, the cylinder of the lower end cap has an open upper end to allow the fluid to flow from the piston to the outlet of the filter.

When the primary filter media is clogged, the lower end wall can be easily removed, e.g., unscrewed, which at the same time removes the pressure-activated sensing device from the cavity within the filter elements. The filter elements can then be easily accessed and removed as a unit from the cylinder, cleansed, and replaced. The lower end wall with integral pressure-activated sensing device can then be easily reattached to the filter housing by screwing the lower end wall on to the canister.

According to another embodiment of the present invention, the upper and lower end walls support a single tubular filter element. In this embodiment, the cylinder formed by the lower inner end cap also has an open upper end. The pressure-activated sensing device on the lower end wall is received within and extends through this cylinder. The remaining structure of the pressure-activated sensing device and the housing is essentially the same as in the first embodiment. The flow through the apertures in the pressure sensing device bears on one side of the piston and the flow from the downstream side of the filter element bears on the other side of the piston to provide a pressure differential across the piston assembly. The pressure activated sensing device operates in the same manner described above and can provide a bypass valve and/or signalling device for the filter assembly.

Thus as described above, the present invention thereby provides an improved reusable fluid filter assembly with a pressure-activated sensing device formed as an integral part with a removable end cap so as to reduce the number of separate components in the filter assembly and facilitate servicing the filter assembly. Further, a common lower end cap with integral pressure-activated sensing device having a signalling device and/or a bypass valve can be easily attached to a filter assembly constructed according to either of the embodiments described above for modularity purposes.

Further features and advantages of the present invention will become apparent upon reviewing the following specifications and attached drawings.

DETAILED DESCRIPTION OF THE PREFERRED EMBODIMENT

Figure 1:
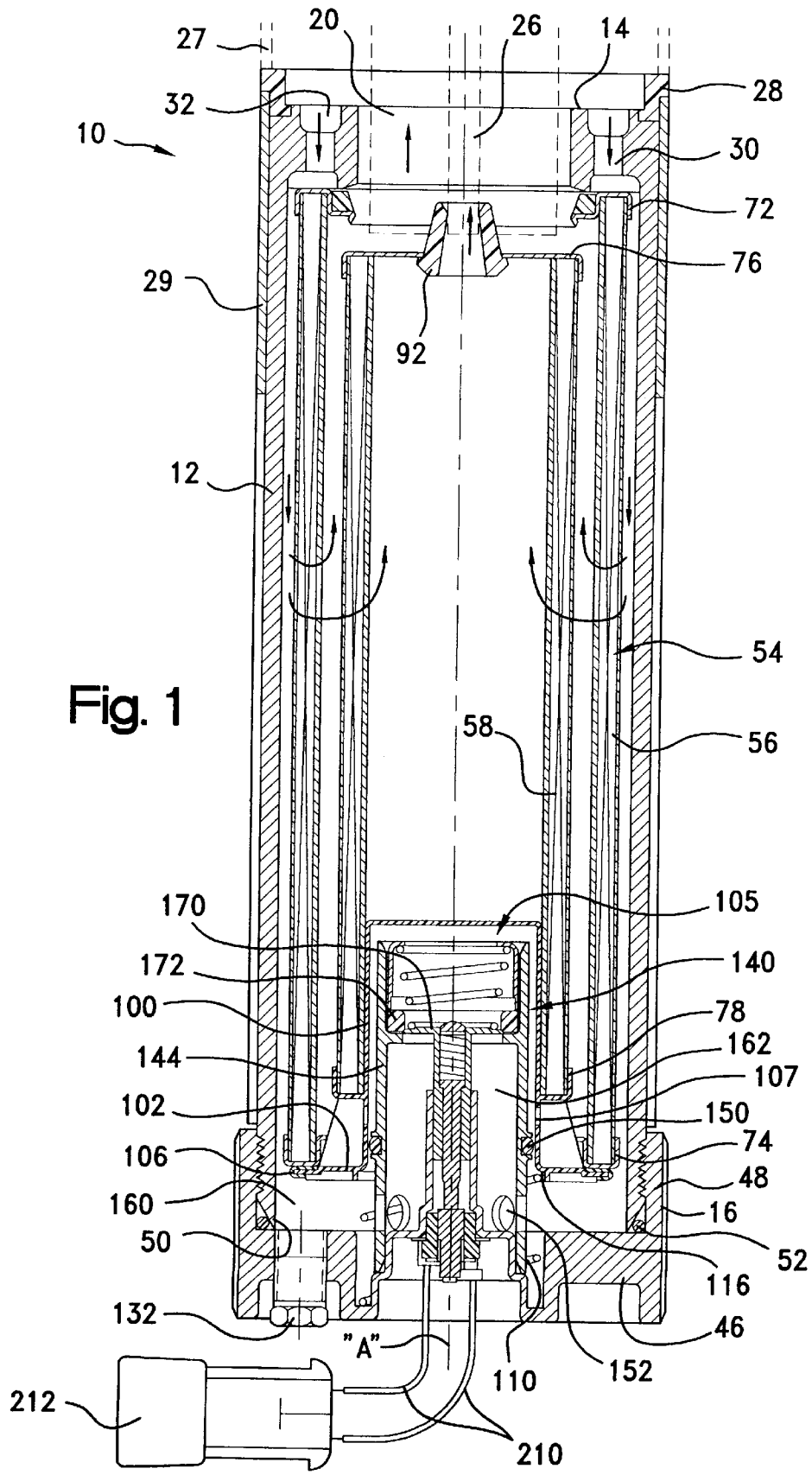
FIG. 1 is a cross-sectional side view of a first embodiment of an oil filter assembly constructed according to the principles of the present invention.
Figure 2:
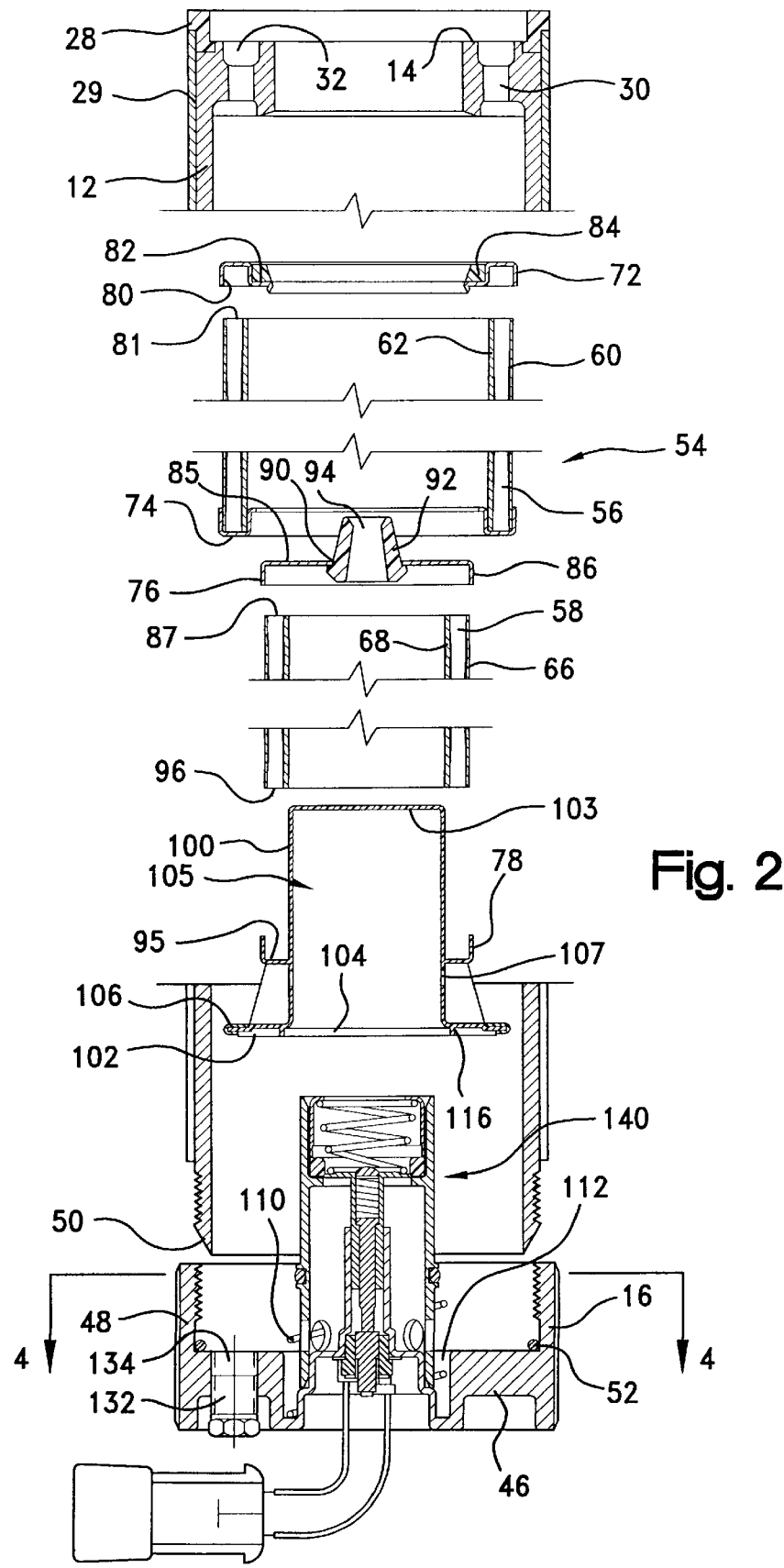
FIG. 2 is a cross-sectional, partially-exploded view of the filter assembly of FIG. 1.

Referring to the drawings, and initially to FIGS. 1 and 2, a first embodiment of the filter of the present invention is indicated generally at 10. The filter includes an assembly including a cylindrical housing or canister 12 with a first annular end wall 14 at one end of the housing, and a second annular end wall 16 at the other end of the housing. For purposes of explanation, the end of the housing with end wall 14 will be referred to as the "upper" end of the filter assembly, while the end of the housing with the end wall 16 will be referred to as the "lower" end of the filter assembly.

The filter assembly 10 is designed to be connected within a fluid system in a conventional manner. For example, a first fluid pipe or conduit 20 providing an outlet fluid passage to e.g., the engine of a vehicle, is received within an opening 22 in the upper end wall 14. Conduit 20 can have threads on the outside surface thereof which cooperate with threads in opening 22 to allow the filter assembly 10 to be removably secured within the fluid system, as is known to those skilled in the art. A second tube or conduit 26 providing an outlet fluid passage to, e.g., the crankcase of the vehicle, also extends through opening 22 and is concentric with and surrounded by conduit 20. Finally, a third tube or conduit 27 is concentrically disposed about the first conduit 20 and second conduit 22. Conduit 27 provides an inlet fluid path to the filter assembly. An elastomeric O-ring type seal or gasket 28 is provided between inlet conduit 27 and end wall 14 to provide a leak-free connection.

Upper end wall 14 also includes a plurality of bores 30 extending axially through the end wall. Bores 30 are evenly spaced in a circle around the surface of the upper end cap and are designed to direct fluid passing from inlet tube 24 into the filter assembly. Preferably there are eight inlet bores in the upper end wall, however, the number (and dimension) of the bores can vary depending upon the particular application. In any case, an annular channel or groove 32 formed in the outer surface of the upper end wall interconnects all the bores for even fluid distribution thereacross. The cylindrical side walls 12 and end wall 14 are preferably formed together in one piece from, e.g., aluminum, using techniques which are commonly know to those skilled in the art, for example, stamping, casting and/or drilling.

A cylindrical collar or sleeve 29 closely surrounds the upper end of housing 12. Collar 29 is preferably also formed from e.g., aluminum, and extends upwardly past the upper end of end wall 14 to form a channel for gasket 28. Gasket 28 could of course be retained on upper end wall 14 using other conventional means.

As indicated previously, lower end wall 16 is removably attached to housing 12. To this end, end wall 16 includes a base 46 and an annular collar 48 which extends upwardly from base 46, and is preferably formed in one piece therewith. A plurality of threads are formed on the inside surface of collar 48. The threads cooperate with threads on the outside surface of the distal end 50 of housing 12 to allow the lower end wall 16 to be easily screwed onto and screwed off of housing 12. An elastomeric O-ring seal 52 is provided between the distal end 50 of housing 12 and end wall 16 to provide a fluid-tight connection. Lower end wall 16 is also preferably formed from conventional material, e.g., aluminum, using common techniques, for example stamping or casting.

Filter media, indicated generally at 54, is located and retained between upper end wall 14 and lower end wall 16. According to this embodiment, filter media 54 preferably comprises an outer tubular filter element 56 and an inner tubular filter element 58. Outer filter element 56 surrounds and is concentric with inner filter element 58. Outer filter element 56 is designed as a primary filter and preferably has an efficiency which is less than the efficiency of the inner secondary filter element 58. As such, larger particles are entrapped in outer filter element 56, while finer particles are entrapped in inner filter element 58. Of course, the efficiency of the outer filter media and inner filter media can be chosen depending upon the particular system requirements.

Each filter element preferably includes a tubular media layer surrounding a perforated support tube. For example, outer filter element 56 includes an outer filter media 60 surrounding an inner perforated support tube 62. Media 60 is preferably an axially-pleated stainless steel screen, or other appropriate metal which is non-reactive with fluid to be filtered. Support tube 62 is preferably galvanized steel. The filter media 60 and support tube 62 could also be formed of non-metallic material, such as paper or cardboard, and in any case, the techniques for forming the filter media 60 and support tube 62 should be well know to those skilled in the art. The inner filter element 58 likewise preferably comprises an outer filter media 66 and an inner perforated support tube 68. Preferably, the filter media 66 and support tube 68 are formed in the same manner and of the same materials as described above with respect to the outer filter element 56.

End caps are disposed at either end of each filter element. Specifically, upper end cap 72 and lower end cap 74 are disposed in opposite ends of outer filter element 56, while upper end cap 76 and lower end cap 78 are disposed at opposite ends of inner filter element 58. Upper end cap 72 for outer filter element 56 comprises an annular, downwardly-facing U-shaped cup or channel 80 which receives the upper end 81 of the outer filter element 56 and is secured thereto with, e.g., adhesive. The end cap 72 also includes an inner annular lip 82 which defines an orifice to receive the primary outlet tube 20 (see e.g., FIG. 1). An annular elastomeric seal 84 is disposed between the upper end cap 72 and end wall 14 for providing a fluid-tight seal therebetween and also a seal between the end cap 72 and the primary outlet tube 20.

The lower end cap 74 for the primary filter element 56 also preferably comprises an annular, upwardly-facing U-shaped cup or channel which receives the lower distal end of the primary filter element and is attached thereto with, e.g., adhesive.

The upper end cap 76 for the secondary filter element 58 has a flat base 85 and a downwardly-extending peripheral flange 86 which receives the upper end 87 of filter element 58 and surrounds the periphery thereof. The upper end cap 76 is secured to filter element 58 by, e.g., adhesive. The flat base 85 of the upper end cap 76 includes a central opening 90 which receives an elastomeric seal element 92. Seal element 92 includes an annular outer groove which receives the annular lip surrounding opening 90, and extends upwardly to receive outlet conduit 26 (FIG. 1). Outlet conduit 26 is received within an annular bore 94 formed centrally through the seal element 92 for a fluid-tight seal therebetween.

Lower end cap 78 also preferably includes an annular, upwardly-facing U-shaped cup or channel 95 which receives the lower end 96 of inner filter element 58, and is attached thereto with e.g., adhesive. The lower end cap 78 further includes a cylindrical portion 100 and a radially-outwardly extending base 102 at the lower distal end of cylindrical portion 100. An imperforate circular end wall 103 closes off the upper end of cylinder 100, while a central circular opening 104 is provided in base 102. The inside surfaces of cylinder 100 and end wall 103 define a main cavity, indicated generally at 105. A plurality of orifices 107 are formed in equal, spaced-apart relation around cylinder 100 of the lower end cap 78. Orifices 107 are formed above base 102, but below cup 95. Preferably, four orifices are spaced evenly around cylindrical wall 100, however, this can vary depending upon the particular fluid flow requirements. Orifices 107 provide flow paths between the inner (downstream) side of outer filter element 56 and main cavity 105, which will be described below in more detail. Preferably cylinder 100, end wall 103 and base 102 are formed in one piece from appropriate material, e.g., plastic.

As will be noted upon viewing FIG. 1, cylinder 100 of lower end cap 78 extends upwardly within inner filter element 58 along the central axis "A" of the housing, and as such is surrounded by the filter media 54. Base 102 of lower end cap 78 supports the lower end cap 74 of the outer primary media 56, although it is noted that the end cap 74 is not attached to base 102, and thus outer filter media 56 remains separate from the inner lower end cap. An annular, C-shaped elastomeric grommet 106 surrounds the peripheral edge of base 102 and provides a seal between the base and the lower end cap 74.

A metal compression spring 110 is disposed within an annular channel or groove 112 formed in base 46 of end wall 16 and extends between the lower end wall and the lower surface of base 102. The upper end of compression spring 110 is bounded by a downwardly-extending annular flange 116 formed on the lower surface of base 102. Compression spring 110 provides an upward bias on lower end cap 78 to properly locate and retain the inner filter element 58 and outer filter element 56 in housing 12, and to prevent unnecessary vibration and movement thereof.

Finally, a threaded plug 132 is received within the corresponding threaded bore 134 formed in end wall 16. End plug 132 can be easily removed using appropriate tools to allow drainage of the filter assembly.

Figure 3:
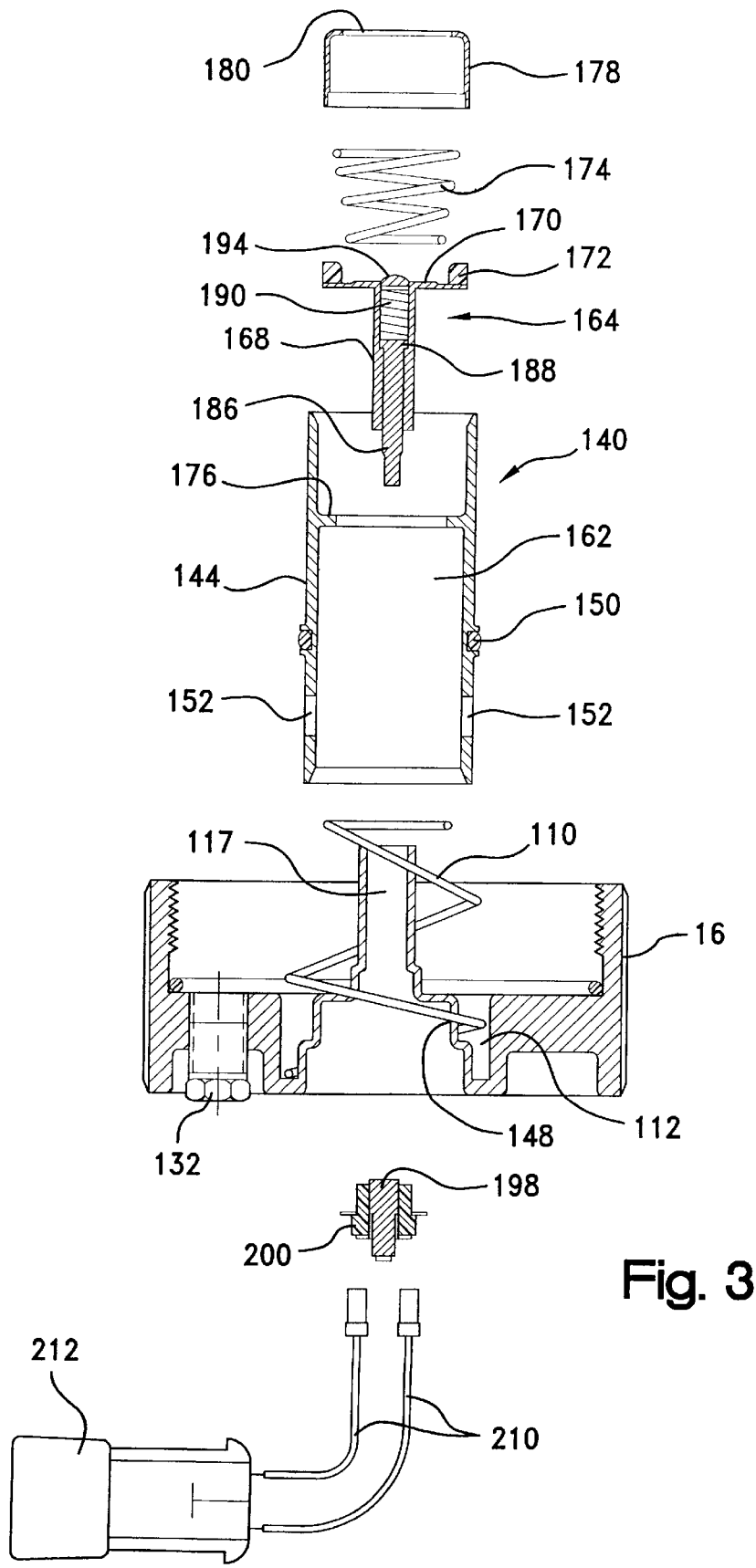
FIG. 3 is a cross-sectional, exploded view of the lower end wall structure.
Figure 4:
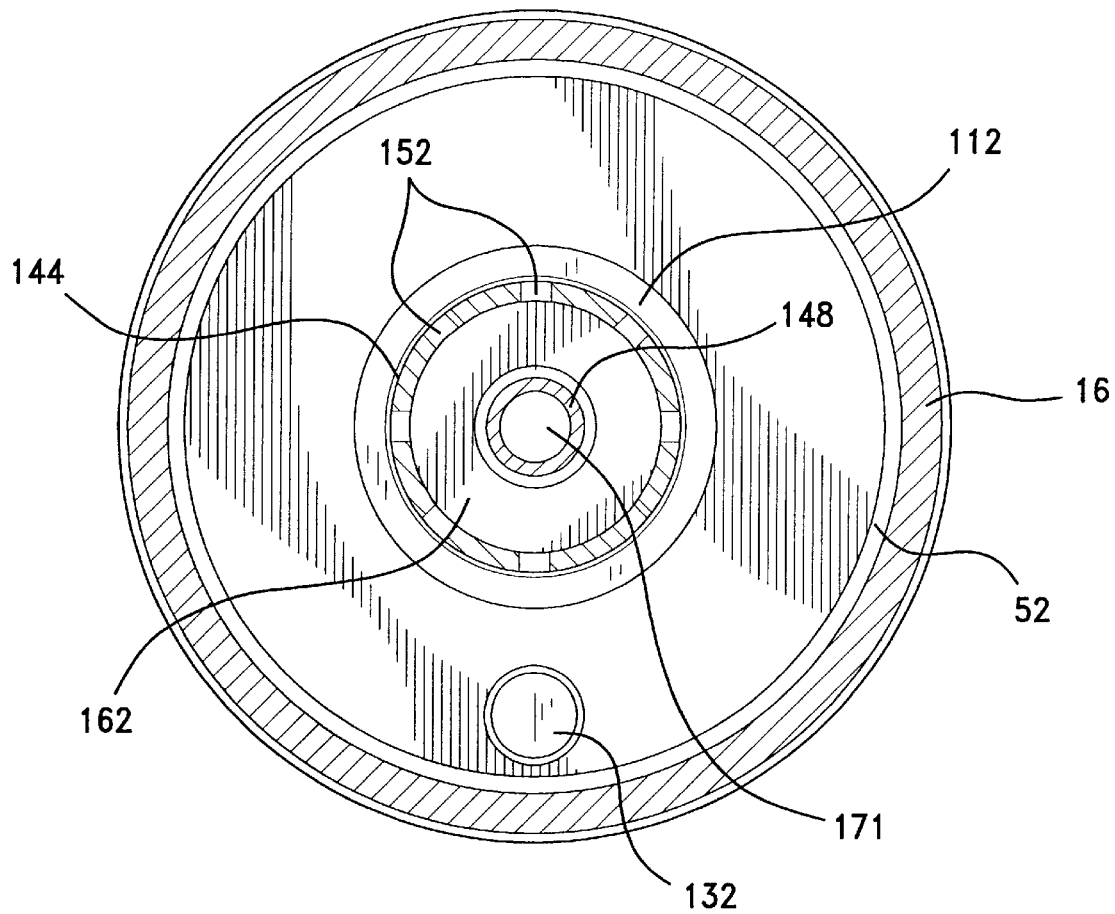
FIG. 4 is a cross-sectional top view taken substantially along the plane defined by lines 4—4 of FIG. 2.

An important aspect of the present invention is the pressure-activated sensing device, indicated generally at 140, which is activated when the primary media becomes clogged. The pressure-activated sensing device 140 is preferably fixed, i.e., secured to, the lower removable end wall 16, and as such, is integral therewith. Referring now to FIGS. 3 and 4, the pressure-activated sensing device 140 preferably includes a cylindrical body 144 formed from, e.g., aluminum, and having an outer dimension which is slightly smaller than the inner dimension of cylinder 100 of the lower inner end cap 78. The lower distal end 146 of body 144 is closely received around an upwardly-extending cylindrical post 148 formed integrally (and preferably in one piece) with lower end cap 16. Appropriate adhesive material can be disposed between the lower distal end 146 of body 144 and post 148 to provide secure attachment therebetween, or the attachment can be by friction fit or other means. Body 144 extends upwardly within cavity 105 (FIG. 1) of end cap 78, and as such, also extends along the central axis "A" of the housing and is surrounded by the filter media 54. An O-ring seal 150 is disposed between body 144 and lower cylinder 100 of end cap 78. Preferably, seal 150 is disposed in an annular channel or groove formed on the exterior surface of body 144, however, the channel or groove could also be formed along the inner surface of cylinder 100 (see FIG. 1A). It is particularly noted that O-ring seal 150 is located axially below orifices 107 in cylinder 107 (see e.g., FIG. 1), such that a fluid-tight seal is provided between body 144 and cylinder 100.

Body 144 further includes a plurality of radial orifices 152 which are located in even, spaced-apart relation around the circumference of body 144, and axially below O-ring seal 150. Orifices 152 fluidly interconnect the lower cavity 160 (FIG. 1) provided between base 102 of the lower inner end cap 78 and end wall 16, with the inner cavity 162 of body 144. Preferably there are eight orifices spaced evenly around body 144, however, the number (and dimension) of the orifices can vary depending upon the particular fluid requirements. Orifices 152 provide flow paths between inlet 27 to the filter assembly and the central cavity 162 of body 144 in the pressure-activated sensor device.

According to one aspect of this embodiment, a piston assembly, indicated generally at 164, is disposed within cavity 162 of body 144. Piston assembly 164 preferably comprises a hollow piston rod 168 and a flat piston head or plate 170, which are preferably formed in one piece from an appropriate material, e.g., brass. Piston rod 168 is disposed for axial movement within the hollow central bore 171 of post 148. Piston plate 170 extends transversely to the piston rod 168 and extends outwardly to the inside surface of body 144. An annular channel or groove is formed around the periphery of the plate 170 and carries an O-ring 172 for sealing plate 170 against the inside surface of body 144 (see also FIG. 1). A compression spring 174 applies a bias against the upper surface of plate 170 and forces plate 170 against an annular flange 176 extending radially inwardly at about the midpoint of body 144. The spring constant of spring 174 is chosen such that a predetermined bias is provided against the piston plate. Spring 174 is held within body 144 by a cup-shaped spring retainer 178. Spring retainer 178 is formed from, e.g., galvanized steel, and has a dimension which tightly fits within the upper end of body 144.

Spring retainer 178 includes a central annular opening 180 at its upper end, and an open bottom end.

The pressure-activated sensing device 140 further includes a signalling device which provides a remote electronic signal to an operator. The signalling device includes a first metal contact pin 186 extending into the hollow bore of piston rod 168. Pin 186 includes an enlarged head 188 which retains the pin within a counterbore in rod 168 such that downward movement of the pin is prevented. A metal compression spring 190 is also disposed within rod 168 and applies a downward bias against pin 186. Pin 186 and compression spring 190 are inserted from the upper end of rod 168 and are held within the central bore by an annular, convexed-curved metal expansion plug 194. Expansion plug 194 can be retained to the top end of piston 164 by friction fit or with, e.g., adhesive. The lower distal (free) end of pin 186 contacts the upper distal (free) end of a second metal contact pin 198. Second pin 198 is fixedly retained within the central bore of post 148 by insulating bushing 200 and other appropriate fasteners. A pair of electrical conductors 210 extend from the lower contact pin 198 to a connector 212. Spring 174 normally biases piston assembly 166 downwardly such that upper contact pin 186 is in engagement with lower contact pin 198. Spring 190 in rod 168 allows some upward movement of upper contact pin 186 such that the upper contact pin is biased against the lower contact pin. When sufficient pressure is provided against the upstream (lower) surface of piston head 170, the piston assembly 164 moves upwardly within body 144 such that upper contact pin 186 eventually moves out of engagement with lower contact pin 198. Appropriate electronic circuitry (not shown) can be connected through connector 212 to provide a remote signal to indicate that contact pins have separated.

While it is believed that the operation of the filter assembly should be apparent from the foregoing discussion, it will nonetheless be briefly described. Referring to FIGS. 1–4, fluid (e.g., oil) from an engine component enters fuel inlets 30 and is directed around the periphery of the outer (primary) filter element 56. The fluid then flows radially inward through the primary filter element 56. The fluid can then pass axially upward through outlet conduit 20 to the engine. The fluid can also flow radially inward through the secondary filter element 58 to be more finely filtered, and then pass axially upward through outlet conduit 26 to the crankcase. In addition, fluid flows downward around the periphery of the primary filter media 56 and into cavity 160, passes through orifices 152 in body 144, and bears against the upstream (lower) surface of piston plate 170. Fluid also flows from the downstream side of primary filter media 56 through orifices 107 in lower end cap 78 and around the periphery of body 144, and then through opening 180 in spring retainer 178 to bear against the downstream (upper) surface of piston head 170. During normal operation, when the pressure drop across primary filter media 56 is negligible, the pressure drop across the piston assembly is also neglible and piston assembly 166 remains in a closed position because of the bias of spring 174 such that upper contact pin 186 remains in electrical contact with lower contact pin 198.

However, when the primary filter media 56 becomes clogged due to particulate matter in the fluid, the pressure drop across this filter media increases. As the pressure drop across the primary filter media increases, the pressure drop across piston plate 170 likewise increases, which causes piston assembly 164 to move upwardly against the bias of spring 174 such that upper contact pin 186 moves out of electrical contact with lower contact pin 198. This movement can be remotely monitored through electrical signals along conduits 210 to sense when the primary filter media has becomes clogged to an unacceptable degree. As should be apparent to those skilled in the art, the spring bias against the plate 170 of the piston assembly (i.e., the spring constant of spring 174) and the spring bias against pin 186 (i.e., the spring constant of spring 190) can be chosen depending upon the particular requirements of the system to provide a signal at an appropriate amount of clogging of the filter media.

Figure 1A:
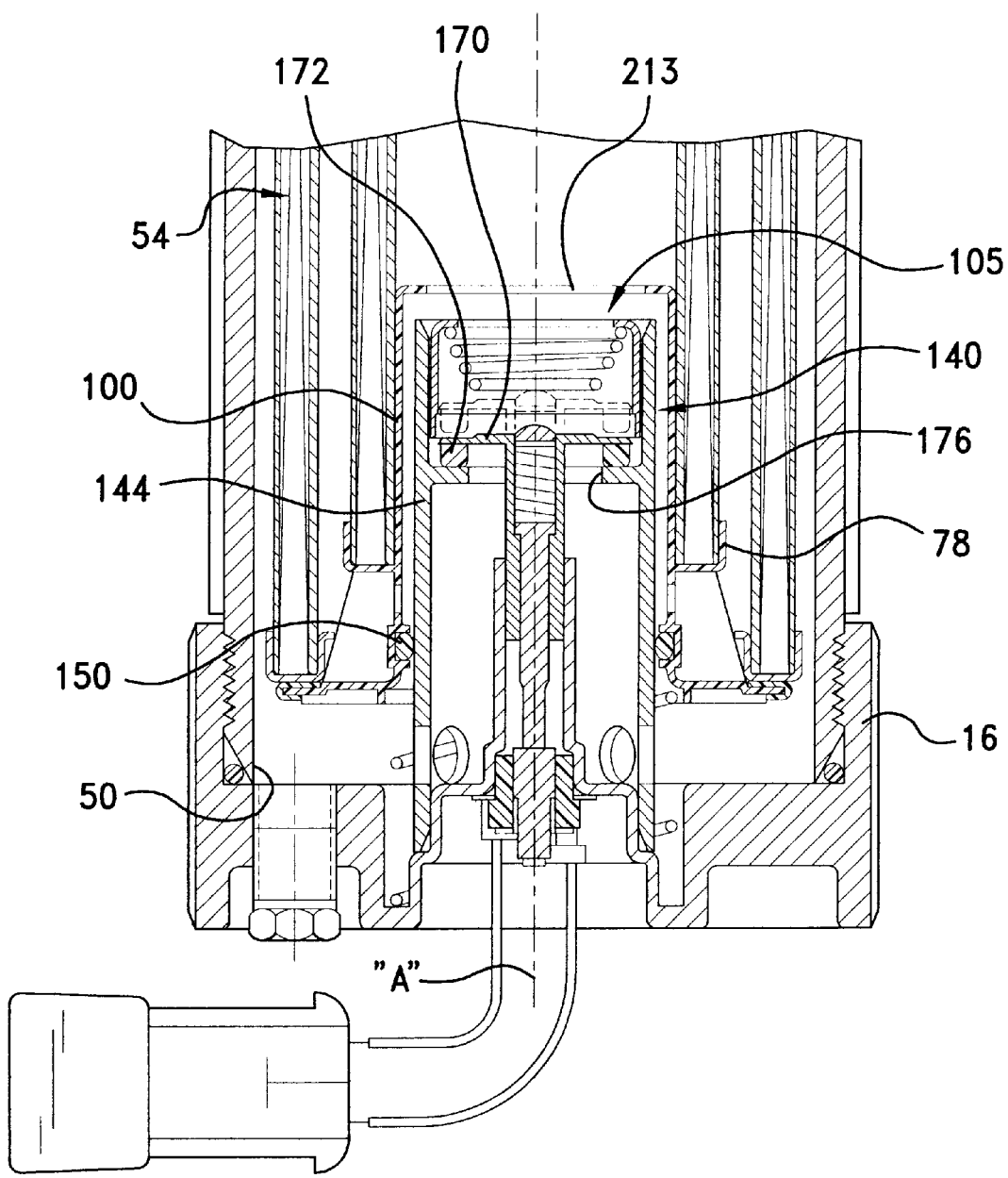
FIG. 1A is an enlarged cross-sectional side view of an additional form of the pressure activated sensing device and filter element.

When the signalling device provides an indication that the primary filter media 56 is clogged, the filter assembly can be drained of fluid by removing plug 132. Thereafter, the lower end wall 16 can be removed by unscrewing the end wall from cylinder 12. When the lower end wall 16 is removed, the pressure-activated sensing device 140 is likewise removed because this device is attached integrally with the lower end wall 16. Access to the primary filter media 56 and secondary filter media 58 is then provided and these filter media can be easily removed from the filter housing, cleaned and replaced. The clean-up is facilitated with the outer filter element being separate from (and hence removable from) the inner filter element. The lower end wall 16 can then be easily replaced on the filter assembly by screwing the end wall onto the cylinder 13. While the first aspect of this embodiment described above depicts an overpressure signalling device, i.e., a device which provides a remote indication of when the pressure drop across the primary filter is above a predetermined level, it is a further aspect of this embodiment to provide a pressure-activated sensing device having an overpressure or bypass valve which would allow fluid to flow through body 144 to outlet conduit 26 when the media becomes clogged. As such, fluid is maintained to the engine (or crankcase), even if unfiltered, at least until the filter elements can be cleaned. As shown in FIG. 1A, piston plate 170 can be modified such that when the piston plate moves upward, fluid is allowed to flow around the piston plate to outlet conduit 26. One means for accomplishing this is to locate seal 172 on piston plate 170 such that the seal bears downward against the annular flange 176 on body 144, and provide piston head 170 with a slightly smaller outer diameter than the inner diameter of body 144. An appropriate aperture 213 can then be provided in end wall 103 of the lower end cap 78 such that when the piston moves to an open position, fluid flows around the piston head to the outlet of the filter assembly. It is noted in this aspect of the invention that the pressure difference across piston assembly 164 is caused by fluid passing through a first flow path through openings 152 in body 144 and against the lower (upstream) side of the piston head, and fluid passing from the (inner) downstream side of filter media structure 54 against the upper (downstream) side of the piston head. As such, when the fluid pressure drop across the primary media 56 exceeds the predetermined value, the piston plate 170 would move against the bias of spring 174, thereby opening a flow path around the piston plate 170 to outlet conduit 26. The bypass valve described above could be used in addition to, or alternatively with, the signalling device described previously.

Figure 5:
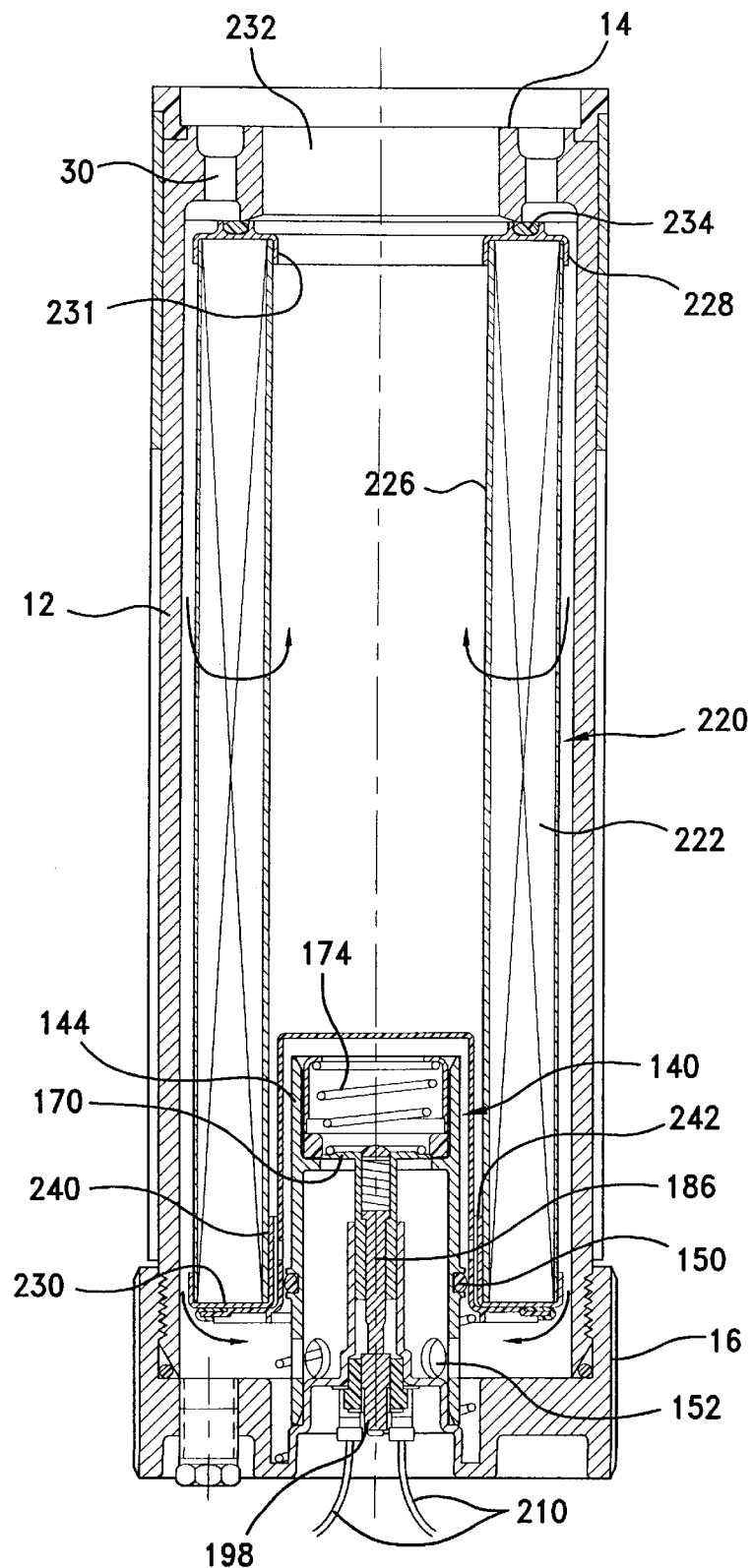
FIG. 5 is a cross-sectional side view of a second embodiment of the oil filter assembly of the present invention.

According to an additional embodiment of the present invention, illustrated in FIG. 5, the filter media comprises a singular tubular filter element, indicated generally at 220. The filter assembly disclosed in this embodiment is designed particularly for a single inlet flow and single outlet flow to the engine. Filter element 220 can have the same structure as either the primary filter element 56 or secondary filter element 58 described previously, e.g., an outer pleated filter media 222 surrounding an inner perforated support tube 226. Filter element 220 can also be formed from the same material described previously (steel mesh and galvanized steel, or paper and cardboard). The filter element 220 also includes an upper annular C-shaped end cap 228, and a lower annular C-shaped end cap 230, which can also be formed of heavy paper or cardboard. Appropriate adhesive can be provided between filter media 220 and the upper and lower end caps 228, 230. Upper end cap 228 has a central annular opening 231 which allows fluid to flow to outlet tube or conduit 232 to the engine. An O-ring or other elastomeric seal 234 is provided in a channel formed in the upper surface of upper end cap 228 and provides a seal between upper end cap 228 and upper end wall 14 of the housing 12. Lastly, lower end cap 230 includes an axially-upwardly extending cylinder portion 240 which is similar to cylinder 100 in the first embodiment, however, this cylinder portion terminates at an open end 242, and does not form an enclosed cavity.

The remaining structure of the filter assembly is the same as described above with respect to the first embodiment, and will not be repeated for sake of brevity. When the lower end wall 16 containing pressure-activated sensing device 140 is attached (i.e., screwed) onto housing 12, the pressure-activated sensing device is received centrally within filter element 220. O-ring seal 150 carried on body 144 of the pressure-activated sensing device seals against the inside surface of cylinder 240 to prevent fluid flow therebetween.

As before, fluid flows from inlets 30 around the periphery of the filter element 220 and normally flows radially inward through the filter element to the outlet conduit 232. When the filter media 222 becomes clogged with particulate matter, the pressure drop across the filter media increases, and fluid flowing through orifices 152 in the pressure-activated sensing device 140 urges piston plate 170 against the bias of spring 174. When the pressure is great enough such that the plate is moved upward and the upper contact pin 186 moves away from the lower contact pin 198, an electric signal can be provided along conductors 210 to provide an indication that the filter element 220 should be removed and replaced. As before, the filter media assembly 220 can be easily removed by draining fluid through port 134 and unscrewing lower end wall 16 from the cylinder 12 to provide easy access to the filter element.

As in the first embodiment, the pressure-activated sensing device 140 can be modified to include a bypass valve, such that a flow path is provided around plate 170 to outlet 232 when the pressure drop across filter media exceeds the predetermined value. It is noted that the filter assembly of the present invention is modular, that is, a lower end wall with a signalling device can be removed and easily replaced with a lower end wall with a signalling device and a bypass valve, depending upon the particular system requirements. In addition, the lower end wall with pressure-activated sensing device can be easily interchanged with filter assemblies having a nested configuration of filter elements (FIG. 1), or a single filter element (FIG. 5).

Figure 6:
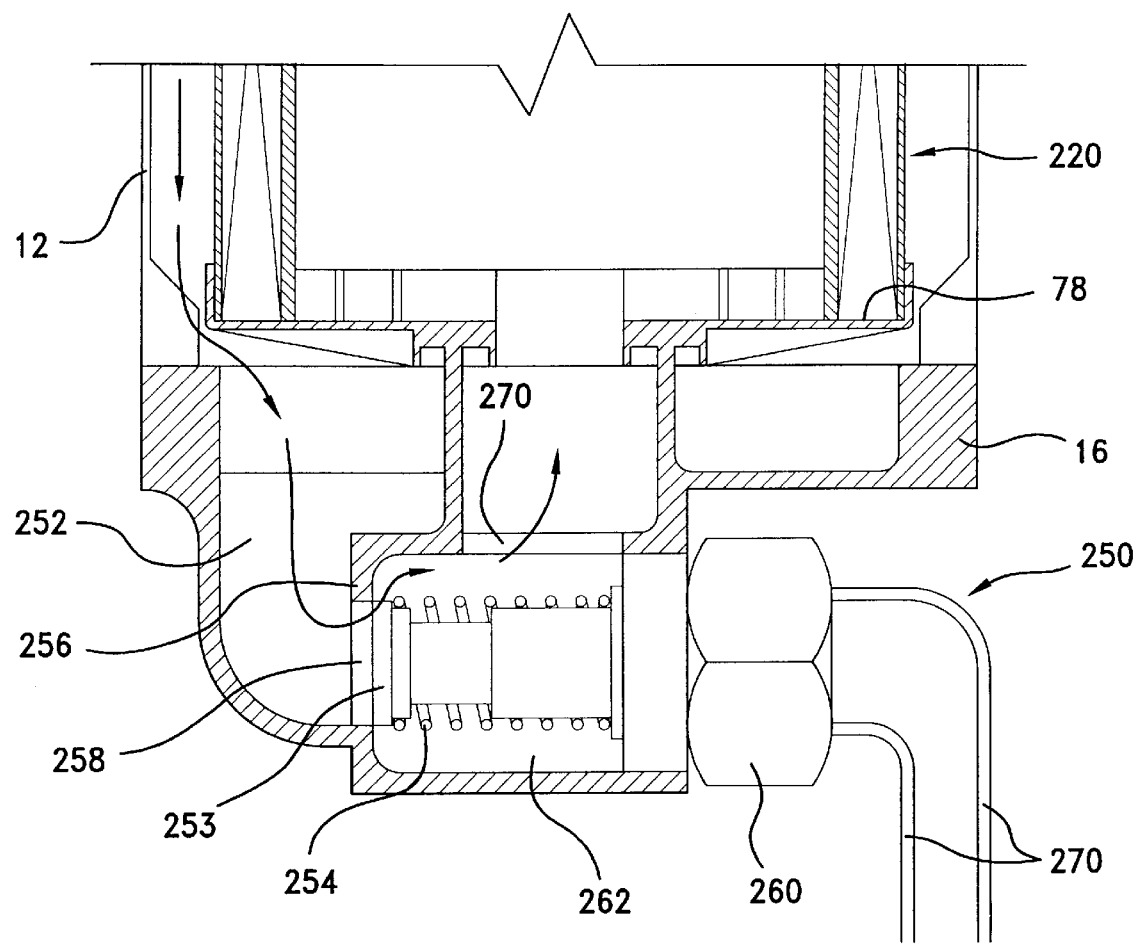
FIG. 6 is a cross-sectional side view of a further aspect of the present invention, illustrating a pressure-activated sensor device disposed transversely to the axis of the filter assembly.

The pressure-activated sensing device in the embodiments described above has been disclosed as extending centrally along the longitudinal axis "A" of the filter assembly. However, according to a further aspect of the invention, the pressure-activated sensing device also could be oriented transversely to the axis of the housing, and be disposed below (not extending into) the filter media. Referring now to FIG. 6, the pressure-activated sensing device, indicated generally at 250, can be located exterior to housing 12, but still integral with end wall 16. In this case, cavity 252 provides a flow path to the upstream side of a piston plate 253. Piston plate 253 is normally biased by spring 254 against flange 256 surrounding annular opening 258. A threaded plug or nut 260 is received within sensor cavity 262 formed in the exterior of end wall 16 and retains the pressure-activated sensing device 250 in this cavity. Plug 260 can be removed to allow access to the pressure-activated device to verify its operation.

The pressure-activated sensing device 250 can include either of the aspects described above, i.e., an overpressure signalling device, or a overpressure signalling device in conjunction with a bypass valve. The illustration in FIG. 6 shows the latter of these, with spring 254 allowing movement of piston plate 253 to allow fluid to flow through opening 258 into cavity 262 and then through 270 to the outlet of the filter assembly. When this happen, an electrical signal is provided on conductors 270 to indicate that the filter element must be changed or cleaned.

The remaining structure of end wall 16 (including the pressure-activated sensing device) and filter housing 12 are preferably the same as discussed above with respect to the first two embodiments, and can include either a nested pair of filter elements (FIG. 1), or a single filter element (FIG. 5).

Thus, as described above, the present invention provides a novel and unique filter which includes a pressure-activated sensing device integral with a removable lower end cap. The filter allows easy and ready access to the filter element(s) within the assembly for easy replacement or cleaning thereof.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter assembly, comprising:
   a housing having a cylindrical sidewall and first and second end walls at either end of said cylindrical sidewall, said first end wall having a fluid inlet port for receiving fluid to be filtered and a fluid outlet port for discharging filtered fluid, said second end wall being removably attached to said sidewall,
   first and second tubular filter elements mounted inside the housing in co-axial relation to one another and extending axially between said first and second end walls, each of said elements including an inlet surface and an outlet surface, with the outlet surface of the first filter element adjacent the inlet surface of the second filter element, a first fluid flow path defined through said first and second filter elements from the inlet port to said fluid outlet port, and
   a pressure-activated sensing device for sensing the pressure across the first filter element to determine when the first filter element becomes clogged, a second fluid flow path defined from said inlet port directly to said sensing device, and a third flow path defined from said inlet port through said first filter element and between said first and second filter elements to said sensing device, said sensing device sensing the pressure difference between the fluid in the second flow path at the inlet surface of the first filter element and the fluid in the third flow path between the outlet surface of the first filter element and the inlet surface of the second filter element, and including a signaling device providing a remote signal when said pressure difference increases above a predetermined level indicating that the first filter element is clogged, said sensing device being disposed centrally within and substantially surrounded by said first and second filter elements and being integrally attached to said second end wall such that said sensing device is removed from said housing when said second end wall is removed.

2. The filter assembly as in claim 1, further including an end cap supporting an end of at least one of said filter elements, said end cap including an axially-extending cylinder disposed centrally within and surrounded by said first and second filter elements and having a first end wall which together with said cylinder defines a main cavity, said sensing device being received in said main cavity of said end cap.

3. The filter assembly as in claim 2, wherein said sensing device comprises a cylindrical body enclosing said overpressure signaling device, and a seal is disposed between the body of the sensing device and the cylinder of the end cap to separate the second and third flow paths.

4. The filter assembly as in claim 3, wherein said sensing device includes a piston assembly normally biased into a closed position, and moveable against a spring into an open position, said second and third flow paths directed by said cylindrical body against opposite sides of a piston in the piston assembly such that the difference in pressures between the fluid in the second and third flow paths moves the piston assembly into the open position when the first filter element becomes clogged.

5. The filter assembly as in claim 4, wherein said body of said sensing device includes an opening to allow fluid to flow in said second flow path against one of the opposite sides of said piston, and said cylinder of said end cap has another opening to allow fluid to flow in the third flow path against the other of the apposite sides of said piston.

6. The filter assembly as in claim 5, wherein said piston has a piston plate carrying a first O-ring seal at its outer periphery, said first O-ring seal providing a seal between said plate and an interior surface of said body of said sensing device.

7. The filter assembly as in claim 6, wherein the body of the sensing device has an exterior dimension which is closely received within an interior dimension of said cylinder of said end cap, said body having a channel on the exterior surface thereof which receives and retains a second O-ring seal for sealing against said cylinder.

8. The filter assembly as in claim 4, wherein said signalling device comprises a first contact pin carried by said piston, and a second contact pin fixed with respect to said second end wall, said first contact pin normally being in contact with said second contact pin when said piston assembly is in the open position, and being out of contact with said second contact pin when said piston assembly is in the closed position.

9. The filter assembly as in claim 8, wherein said piston includes a hollow piston rod carrying said first contact pin, and a piston head which is fluidly sealed against an interior surface of said sensing device body to prevent fluid from passing around the piston head.

10. The filter assembly as in claim 1, wherein an axis is defined through a geometric center of the sensing device, said sensing device being located within said housing such that the axis of the sensing device is co-axially aligned with an axis along a geometric center of the housing.

11. The filter assembly as in claim 1, wherein said second end wall includes an annular base and a collar extending around the periphery of the base, said collar including a threaded wall surface to enable the end cap to be removably attached to corresponding threads on said sidewall of said housing, a fluid cavity being defined between said annular base and said filter media to allow fluid to flow through said second flow path.

12. The filter assembly as in claim 1, wherein the first and second tubular filter elements are removably mounted in the housing.

13. A filter assembly, comprising:
 a housing having a cylindrical sidewall and first and second end walls at either end of said cylindrical sidewall, said first end wall having a fluid inlet port for receiving fluid to be filtered and a fluid outlet port for discharging filtered fluid, said second end wall being removably attached to said side wall and having a cavity opening exteriorly of the housing,
 tubular filter media removably mounted inside the housing and extending axially between said first and second end walls, a first fluid flow path defined through said filter media from the inlet port to the outlet port, and
 a pressure-activated sensing device for sensing the pressure across said filter media, a second fluid flow path defined from said inlet port directly to said sensing device, said sensing device sensing the pressure difference between the fluid in the first flow path and the fluid in the second flow path, and including a signaling device contained entirely within the cavity in the second end wall and providing a remote signal when said pressure difference increases above a predetermined level indicating that the filter media is clogged, said sensing device being disposed centrally within and substantially surrounded by said filter media and being integrally attached to said second end wall such that said sensing device is removed from said housing when said second end wall is removed.

14. The filter assembly as in claim 13, further including an end cap having an annular base supporting an end of said filter media and an axially-extending cylinder fixedly attached to said base and disposed centrally within and surrounded by said filter media, said sensing device being received within and surrounded by said cylinder.

15. The filter assembly as in claim 14, further including an imperforate end wall at one end of said cylinder spaced from said base, said imperforate end wall and cylinder defying an enclosure for said sensing device and preventing fluid in said second flow path from communicating the fluid in said first flow path.

16. The filter assembly as in claim 15, wherein said end cap includes a radially-projecting base fixedly attached to said cylinder at another end of said cylinder for supporting an end of said filter media.

17. The filter assembly as in claim 13, wherein said second end wall includes an annular base and a collar extending around the periphery of the base, said collar including a threaded wall surface to enable the second end wall to be removably attached to corresponding threads on said sidewall of said housing, a fluid cavity being defined between said annular base and said filter media to allow fluid to flow through said second flow path.

18. The filter assembly as in claim 17, wherein said over pressure signaling device includes a retaining device retaining the signaling device within a cavity of the second end wall, said retaining device being removable to allow the signaling device to be removed from th cavity while the second end wall is attached to said housing.

19. The filter assembly as in claim 13, wherein an axis is defined through a geometric center of the sensing device, said sensing device being located within said housing such that the axis of the sensing device is co-axially aligned with an axis along a geometric center of the housing.

20. The filter assembly as in claim 13, wherein said signaling device includes electrical leads, said leads extending into the cavity in the second end wall to allow the remote signal indicating a clogged filter media to be transmitted to an operator.

21. A filter assembly, comprising:
 a housing having a cylindrical sidewall and first and second end walls at either end of said cylindrical sidewall, said first end wall having a fluid inlet port for receiving fluid to be filtered and a fluid outlet port for discharging filtered fluid, said second end wall being removably attached to said sidewall,
 tubular filter media mounted inside the housing and extending axially between said first and second end walls, a first fluid flow path defined through said filter media from the inlet port to the outlet port, said media supported by an end cap having an annular base and an axially-extending cylinder fixed to said base and disposed centrally within and surrounded by said filter media, and
 a pressure-activated sensing device for sensing the pressure across said filter media, said sensing device disposed within and surrounded by said cylinder of said end cap and integrally attached to said second end wall such that said sensing device is removed from the housing when the second end wall is removed, a second fluid flow path defined from said inlet port directly to said sensing device, said sensing device sensing the pressure difference between the fluid in the first flow path and the fluid in the second flow path, and including a signaling device providing a remote signal when said pressure difference increases above a predetermined level indicating that the filter media is clogged, wherein said sensing device comprises a cylindrical body enclosing the signaling device, and a first O-ring seal is disposed between the body of the sensing device and the cylinder of the end cap to separate the first and second flow paths, the body of the sensing device having an exterior dimension which is closely received within an interior dimension of said cylinder of said end cap, said body having a channel on the exterior surface thereof which receives and retains the first O-ring seal for sealing against the cylinder of the end cap.

22. The filter assembly as in claim 21, wherein said sensing device includes a piston assembly normally biased into a closed position, and moveable against a spring into an open position, said first and second flow paths being applied against opposite sides of a piston in the piston assembly such that the difference in pressures between the fluid in the first and second flow paths moves the piston assembly into the open position when the filter media becomes clogged.

23. The filter assembly as in claim 22, wherein said body of said sensing device includes an opening to allow fluid to flow in said second flow path against one of the opposite sides of said piston.

24. The filter assembly as in claim 23, wherein said piston has a piston plate carrying a second O-ring seal at its outer periphery, said second O-ring seal providing a seal between said plate and an interior surface of said body of said sensing device to fluidly separate said first and second flow paths.

25. The filter assembly as in claim 22, wherein the signalling device cooperates with said piston assembly for providing a remote indication of when the piston assembly moves into the open position.

26. The filter assembly as in claim 21, wherein said cylinder includes a first opening to allow fluid to flow in said first flow path against a first side of said sensing device.

27. The filter assembly as in claim 26, wherein said body of said sensing device includes a second opening to allow fluid to flow in said second flow path against a second side of said sensing device, said O-ring seal being disposed between said first and second openings to fluidly separate said first side of said sensing device from said second side of said sensing device.

28. The filter assembly as in claim 21, wherein the tubular filter media is removably mounted in the housing.

29. A filter assembly, comprising:
a housing having a cylindrical sidewall and first and second end walls at either end of said cylindrical sidewall, said first end wall having a fluid inlet port for receiving fluid to be filtered and a fluid outlet port for discharging filtered fluid, said second end wall being removably attached to said sidewall,
tubular filter media mounted inside the housing and extending axially between said first and second end walls, a first fluid flow path defined through said filter media from the inlet port to the outlet port, said media supported by an end cap having a radially-extending annular base and an axially-extending cylinder fixed at one end to said base and disposed centrally within and surrounded by said filter media, an end wall at another end of the cylinder, said end wall and cylinder defining an enclosure for said sensing device and preventing fluid in said second flow path from communicating with fluid in said first flow path, and
a pressure-activated sensing device for sensing the pressure across said filter media, said sensing device disposed within and surrounded by said cylinder of said end cap, and being integrally attached to said second end wall such that said sensing device is removed from said housing when said second end wall is removed, a second fluid flow path defined from said inlet port directly to said sensing device, said sensing device sensing the pressure difference between the fluid in the first flow path and the fluid in the second flow path, and including a signaling device providing a remote signal when said pressure difference increases above a predetermined level indicating that the filter media is clogged, wherein said sensing device comprises a body enclosing the signaling device, and an O-seal is disposed between the body of the sensing device and the cylinder of the end cap to separate the first and second flow paths, the body of the sensing device having an exterior dimension which is closely received within interior dimension of said cylinder of said end cap, said body having a channel on the exterior surface hereof which receives and retains the O-seal for sealing against said cylinder.

30. The filter assembly as in claim 24, wherein said cylinder includes an opening to allow fluid in one of said flow paths to flow against a first side of said sensing device.

31. The filter assembly as in claim 30, wherein said body of said sensing device includes an opening to allow fluid to flow in another of said flow paths against a second side of said sensing device, said first side of said sensing device being fluidly separated from said second side of said sensing device.

32. The filter assembly as in claim 29, wherein the tubular filter media is removably mounted in the housing.

33. A filter assembly, comprising:
a housing having a cylindrical sidewall and first and second end walls at either end of said cylindrical sidewall, said first end wall having a fluid inlet port for receiving fluid to be filtered and a fluid outer port for discharging filtered fluid, said second end wall being removably attached to said sidewall,
tubular filter media mounted inside the housing and extending axially between said first and second end walls, a first fluid flow path defined through said filter media from the inlet port to the outlet port, said media supported by an end cap having an annular base and an axially-extending cylinder fixed to said base and disposed centrally within and surrounded by said filter media, and
a pressure-activated sensing device for sensing the pressure across said filter media, said sensing device disposed within and surrounded by said cylinder of said end cap and integrally attached to said second end wall such that said sensing device is removed from the housing when the second end wall is removed, a second fluid flow path defined from said inlet port directly to said sensing device, said sensing device further including a piston assembly normally biased into a closed position and moveable against a spring into an open position, said first and second flow paths being applied against opposite sides of a piston in the piston assembly such that the difference in pressures between the fluid in the first and second flow paths moves the piston assembly into the open position when the filter media becomes clogged, and including a signally device cooperating with said piston assembly for providing a remote indication of when the piston assembly moves into the open position, said sensing device comprising a cylindrical body enclosing the signally device, and a seal is disposed between the body of the sensing device and the cylinder of the end cap to separate the first and second flow paths, and wherein said signally device comprises a first contact pin carried by said piston, and a second contact pin fixed with respect to said second end wall, said first contact pin normally being in contact with said second contact pin when said piston assembly is in the open position, and being out of contact with said second contact pin when said piston assembly is in the closed position.

34. The filter assembly as in claim 33, wherein said piston includes a hollow piston rod carrying said first contact pin, and a piston head which is fluidly sealed against an interior surface of said cylindrical body of said sensing device to prevent fluid from passing around the piston head.

35. A filter assembly, comprising:
a housing having a cylindrical sidewall and first and second end walls at either end of said cylindrical sidewall, said first end wall having a fluid inlet port for receiving fluid to be filtered and at least one fluid outlet port for discharging filtered liquid,
tubular filter media mounted inside the housing and extending axially between said first and second end walls, a first fluid flow path defined through said filter media from the inlet port to said at least one outlet port, and
a pressure-activated sensing device supported by the said second end wall, said sensing device comprising a body enclosing an overpressure device for sensing the pressure across the filter media and a second fluid flow path defined from said inlet port directly to said sensing device, and
an end cap supporting said filter media, said end cap including a cylinder extending axially within and surrounded by said filter media, said sensing device also being received within and surrounded by said cylinder, and an annular seal disposed between the body of the sensing device and the cylinder of the end cap to separate the first and second flow paths, the body of the sensing device having an exterior dimension which is closely received within an interior dimension of said cylinder of said end cap, one of said body and said cylinder having a channel on a surface thereof which receives and retains the annular seal for sealing against the other of said body and said cylinder.

36. The filter assembly as in claim 35, wherein said second end wall is removably attached to said sidewall.

37. The filter assembly as in claim 35, wherein the tubular filter media is removably mounted in the housing.

38. The filter assembly as in claim 35, wherein said overpressure device comprises a by-pass valve.

39. The filter assembly as in claim 38, wherein said overpressure device further includes a signaling device.

40. The filter assembly as in claim 35, said cylinder includes an imperforate end wall which defines a cavity, and said sensing device is received within said cavity.

41. A filter assembly, comprising:
a housing having a cylindrical sidewall and first and second end walls at either end of said cylindrical sidewall, said first end wall having a fluid inlet port for receiving fluid to be filtered and at least one fluid outlet port for discharging filtered liquid,
tubular filter media mounted inside the housing and extending axially between said first and second end walls, a first fluid flow path defined through said filter media from the inlet port to said at least one outlet port, and
a pressure-activated sensing device supported by the said second end wall, said sensing device comprising a body enclosing an overpressure device for sensing the pressure across the filter media, and a second fluid flow path defined from said inlet port directly to said sensing device, and
an end cap supporting said filter media, said end cap including a cylinder extending axially within and surrounded by said filter media, said sensing device also being received within and surrounded by said cylinder, and an annular seal disposed between the body of the sensing device and the cylinder of the end cap to separate The first and second flow paths, the body of the sensing device having an exterior dimension which is closely received within an interior dimension of said cylinder of said end cap, said body having a channel on the exterior surface thereof which receives and retains the annular seal for sealing against said cylinder and wherein said cylinder includes an end wall which defines a cavity, and said sensing device is received within said cavity, said filter media comprising a pair of filter elements, a third fluid flow path defined from said inlet port through one of said filter elements directly to said sensing device, said sensing device sensing the pressure difference between the fluid in the second flow path at an inlet surface of said one filter element and the fluid in the third flow path at an outlet surface of said one filter element.

42. The filter assembly as in claim 41, wherein said pressure-activated sensing device includes a piston assembly normally biased into a closed position, and moveable against a spring into an open position, said second and third flow paths being directed by said cylindrical body against opposite sides of a piston plate in the piston assembly such that the difference in pressure between the fluid in the second and third flow paths tends to move the piston assembly into the open position when the filter media becomes clogged.

43. A filter assembly, comprising:
a housing having a cylindrical sidewall and first and second end walls at either end of said cylindrical sidewall, said first end wall having a fluid inlet port for receiving fluid to be filtered and at least one fluid outlet port for discharging filtered liquid,
tubular filter media mounted inside the housing and extending axially between said first and second end walls, a first fluid flow path defined through said filter media from the inlet port to said at least one outlet port, and
a pressure-activated sensing device supported by the said second end wall, said sensing device comprising a body enclosing an overpressure device for sensing the pressure across the filter media and a second fluid flow path defined from said inlet port directly to said sensing device, and
an end cap supporting said filter media, said end cap including a cylinder extending axially within and surrounded by said filter media, said sensing device also being received within and surrounded by said cylinder, and an annular seal disposed between the body of the sensing device and the cylinder of the end cap to separate the first and second flow paths, the body of the sensing device having an exterior dimension which is closely received within an interior dimension of said cylinder of said end cap, said body having a channel on the exterior surface thereof which receives and retains the annular seal for sealing against said cylinder and wherein said cylinder includes a first opening to allow fluid to flow in said first flow path against a first side of said sensing device.

44. The filter assembly as in claim 43, wherein said body of said sensing device includes a second opening to allow fluid to flow in said second flow path against a second side of said sensing device, said annul seal being disposed between said first and second openings to fluidly separate said first side of said sensing device from said second side of said sensing device.

45. A filter assembly, comprising:
a housing having a cylindrical sidewall and first and second end walls at either end of said cylindrical sidewall, said first end wall having a fluid inlet port for receiving fluid to be filtered and at least one fluid outlet port for discharging filtered liquid,
tubular filter media mounted inside the housing and extending axially between said first and second end walls, a first fluid flow path defined through said filter media from the inlet port to said at least one outlet port, and
a pressure-activated sensing device supported by the said second end wall, said sensing device comprising a body enclosing an overpressure device for sensing the pressure across the filter media, and a second fluid flow path defined from said inlet port directly to said sensing device, and
an end cap supporting said filter media, said end cap including a cylinder extending axially within and surrounded by said filter media, said sensing device also being received within and surrounded by said cylinder, and an annular seal disposed between the body of the sensing device and the cylinder of the end cap to separate the first and second flow paths, the body of the sensing device having an exterior dimension which is closely received within an interior dimension of said cylinder of said end cap, said body having a channel on the exterior surface thereof which receives and retains the annular seal for sealing against said cylinder and wherein said overpressure device comprises a signaling device.

46. The filter assembly as in claim 45, wherein said signaling device includes means to provide a remote signal when the signaling device senses a predetermined fluid pressure.

* * * * *